Feb. 19, 1957 H. E. HRUSKA 2,781,781
VALVE
Filed Feb. 28, 1952

INVENTOR.
HOWARD E. HRUSKA
BY Cecil J Arens

ATTORNEY

United States Patent Office 2,781,781
Patented Feb. 19, 1957

2,781,781

VALVE

Howard E. Hruska, South Bend, Ind., assignor to Bendix Aviation Corporation, South Bend, Ind., a corporation of Delaware Application February 28, 1952, Serial No. 273,841

11 Claims. (Cl. 137—621)

This invention concerns controls for fluid operated devices and more particularly valves.

It is an object of this invention to provide a novel valve of the normally open type.

A further important object is to provide a valve of the normally open type utilizing poppet valve construction.

A still further object is to provide a lift valve having hydraulic reaction proportional to the force required to seat said valve.

Figure 1:
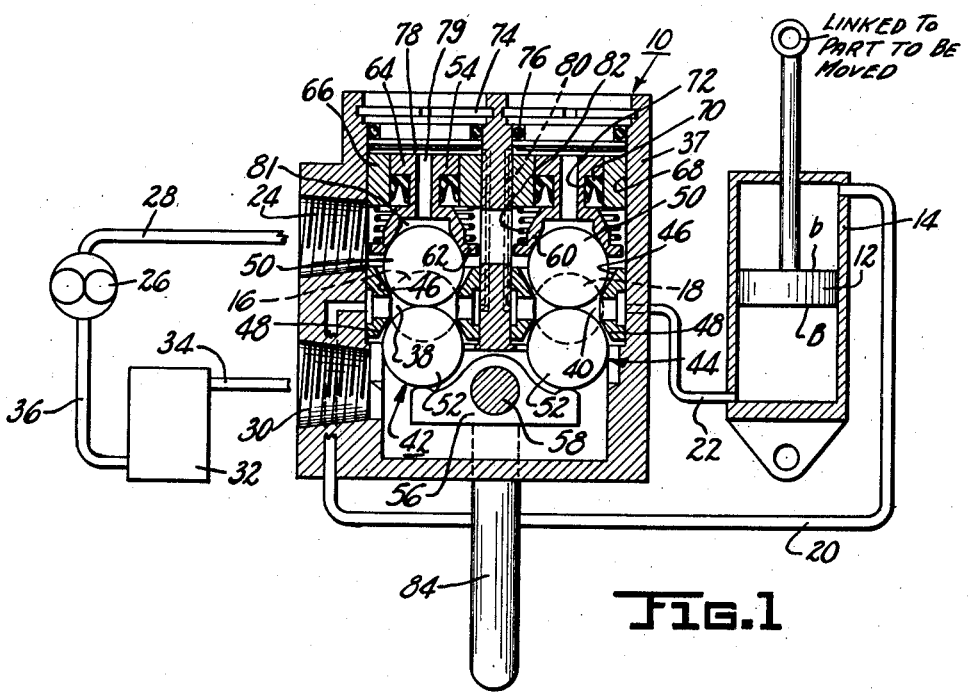
Figure 2:
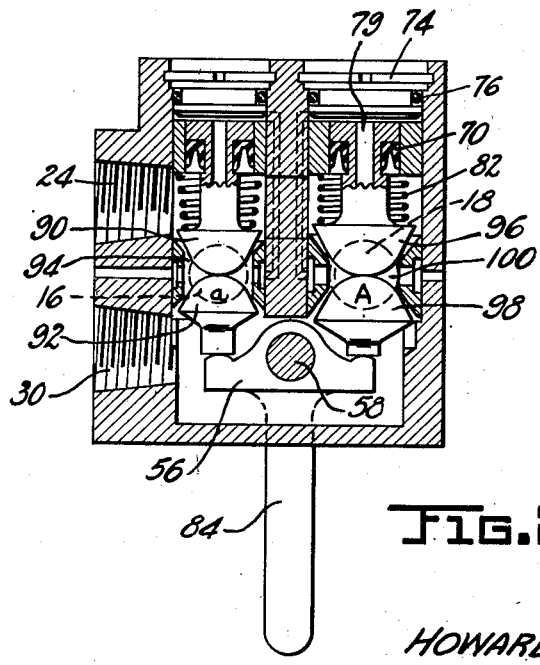

The above and other objects and features of the invention will be apparent from the following description of the apparatus taken in connection with the accompanying drawings which form a part of this specification, and in which:

Figure 1 illustrates one form of the invention, shown connected in one type of fluid system with which the device may be used; and Figure 2 is a modified form of the invention shown in Figure 1.

Referring now to Figure 1, the reference numeral 10 designates the fluid control device of the invention which is located in a hydraulic system for controlling movement of a piston 12, slidably positioned in a cylinder 14, connected to working ports 16 and 18 of the control device via pipe lines 20 and 22, respectively. An inlet port 24 communicates with the discharge side of pump 26 through conduit 28. An outlet port 30 is connected to reservoir 32 via pipe line 34. A conduit 36 communicates the inlet side of the pump 26 to the reservoir 32.

The fluid control device 10 comprises a body 37 provided with flow passages 38 and 40 connecting the inlet port 24 with the outlet port 30. The working ports 16 and 18 are connected to the passages 38 and 40, respectively, intermediate the ends of said passages. Valves 42 and 44 control communication between the working ports 16 and 18 and the inlet and outlet ports. Since the valves and their supporting structure are of identical construction, a detail description of valve 42 only will be given. This valve comprises valve seats 46 and 48 located in the ends of the passage 38. Valve members 50 and 52 are carried between a guide element 54 and a rotatable balance beam 56, the latter of which is pivotally supported by a shaft 58, mounted in the body 36. The guide element 54, which also serves as a balancing plunger, is formed at one end with a seat 60 and a flange 62. The other end 64 of the guide element 54 is slidably positioned in a bushing or sleeve 66 pressed into a bore 68 located in the body. A sealing ring 70 is received by a groove 72 of the guide element, and prevents leakage between the inlet port 24 and the end of the guide element. A plug 74 is placed in the end of the bore 68 and is equipped with an O-ring 76 to seal chamber 78 from atmosphere. A central bore 79 in the guide element communicates the chamber 78 with chamber 81, to thereby prevent the entrapment of fluid in the latter chamber, which would tend to keep the ball valve member 50 from seating on seat 60. A passageway 80 connects the chamber 78 to the passage 38 at a point therein intermediate its ends. This connecting point, it will be noted, is also between the valve seats 46 and 48. A spring 82 is interposed between the flange 62 of the guide element and the sleeve 66 to thereby move the valve member 50 onto the valve seat 46 and the valve member 52 farther away from the valve seat 48 when the beam 56 is rotated in a counterclockwise direction, as viewed in Figure 1. The valve members or balls 50 and 52 are selected so that when the valve 42 is in its normally open position, there is a predetermined distance between the valve members and their corresponding valve seats 46 and 48. The diameters of the effective seating areas of the valve members 50 and 52 when seated on seats 46, 48 and 60 are the same as the diameter of the effective area of the end of guide element 64 exposed to the chamber 78. The passageway 80 communicates the pressure existing in the passage 38 to the chamber 78. With the valve member 52 urged against the valve seat 48, due to rotation of the beam 56, there will be a hydraulic reaction force built upon the effective area of the valve member 52. This reaction force is equal to the effective seating area of the valve member 52 multiplied by the pressure in the passage 38. Manual means, such as a lever 84, is secured to an end of the shaft 58, which extends through the body 36. This lever may be operated directly by hand or operatively connected to other mechanism, not shown, for controlling valve movement.

The valves 42 and 44 are of the normally open type, that is, communication is normally established between all the ports when the valves are in the position shown in Figure 1. The valves 42 and 44 are also statically balanced at this time since the springs 82, which are of equal strength, act on the balance beam 56 at points equal distance from the fulcrum or shaft 58.

The device of Figure 2 differs from that of Figure 1 principally in the type of valve members used. Instead of using balls, the modified version employs cone-shaped valve members 90 and 92 which control flow through passage 94, and cone-shaped members 96 and 98 for controlling flow through passage 100. Another difference between the valves of Figures 1 and 2 is that the effective seating areas of the valve members 50 and 52 of valves 42 and 44 are the same, but the effective seating areas of the valve members 90 and 92 are smaller than the corresponding effective seating areas of the valve members 96 and 98. If the device 10 of Figure 1 were replaced in the system by the device of Figure 2, the working port 16 would communicate with the upper end of the fluid motor and the working port 18 would communicate with the lower end of the fluid motor. It will be noted that the valve members 90 and 92, having the smaller effective areas, will have the same pressure acting thereon as is acting in the upper end of the fluid motor and the valve members 96 and 98, having the larger effective areas, will be subjected to the same pressure as is acting in the lower end of the fluid motor. This arrangement has been found to be extremely useful where it is desired that the hydraulic reaction resisting movement of the valve (imparted thereto by the lever 84) be proportional to the force applied to the moved part (in this case, the piston 12). That is, the effective area of the valve member 92 is to the annular area of the piston (total areas minus the piston rod) as the effective area of the valve member 98 is to the total area of the piston. Stated another way, $a/b = A/B$.

Operation and function of the invention is as follows:

With the valve ports in the position shown in Figure 1, communication is established between all the ports. Rotation of the lever 84 in a clockwise direction against the spring 82 operates the valve 42, causing the valve member 52 to move toward the valve seat 48 and the valve member 50 to move farther away from its valve seat 46, thus increasing flow from the inlet port to the working port 16 and cutting off flow from the latter port to the outlet port. Rotation of the lever 84 clockwise allows also the valve 44 to come into operation, permitting the valve members 50 and 52 to move downwardly under the influence of the spring 82, to thereby cut off flow between the working port 18 and the inlet port 24 and increases the opening between the valve member 52 and its valve seat 48, to provide for an increase in flow from the working port 18 to the outlet port 30.

Movement of the valves 42 and 44 as aforesaid, in response to clockwise rotation of the lever 84, causes a hydraulic reaction to be built up in the valve 42, which reaction acts on the effective area of the valve member 52, which area is determined by the diameter of the seat 48, tending to resist further rotation of the lever 84 in a clockwise direction. Since the pressure in the passage 38 also acts in the chamber 78 via the passageway 80, and the effective areas of the end of the valve guide element and the valve seat 60 on which the valve member 50 seats are the same, the valve member 50 and the guide element 54 are hydraulically balanced against the pressure built up in passage 38 and acting in the chamber 78. This same pressure in passage 38 acts on the effective area of the valve member 52 to establish the hydraulic reaction. The valve 44 is at this time hydraulically balanced against inlet port pressure and reservoir pressure since the guide element 54 and the valve member 50 have equal areas exposed to these pressures. It will be noted that valve member 50 and guide element 54 are always in a state of hydraulic balance whether the aforementioned valve member is on or off seat 46. Obviously, with such an arrangement, hydraulic reaction opposing movement of said member 52 toward its seat is always proportional to the effective seating area of the valve member 52.

Rotation of the lever 84 in a counterclockwise direction reverses the action of the valves 42 and 44. That is, the hydraulic reaction, resisting rotation of the lever 84, would now come from the valve 44. The valves move in opposite directions upon rotation of the lever 84.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A fluid control device comprising inlet and outlet ports, a first passage connecting the inlet port with the outlet port, a second passage connecting the inlet port with the outlet port, two working ports, one of which is connected to the first passage intermediate its ends and the other of which is connected to the second passage intermediate its ends, a valve in each passage for controlling communication between the respective working ports and the inlet and outlet ports, said valve comprising two valve seats, one between the working port and the inlet port and the other between the working port and the outlet port, two valve members for the valve seats, said valve members having a neutral position in which communication is established between the respective working ports and the inlet and outlet ports via said passages, said valve members being movable in one direction from said neutral position to cause one of said valve members to move toward said one valve seat and the other of said valve members to move further away from said other valve seat and movable in the opposite direction to cause said one valve member to move further away from said one valve seat and the other valve member to move toward said other valve seat, means for hydraulically balancing said one valve member, said means comprising a valve guide element having a seat thereon for supporting said one valve member, said guide element and said one valve member always being in a state of hydraulic balance whether said one valve member is on or off said one valve seat, said other valve member being subjected to hydraulic reaction proportional to its effective seating area when it is moved toward said other seat, and means for moving said valves so that said one valve member of one of the valves moves toward said one seat and the other valve member of said other valve moves toward said other seat.

2. A fluid control device comprising inlet and outlet ports, a first passage connecting the inlet port with the outlet port, a second passage connecting the inlet port with the outlet port, two working ports, one of which is connected to the first passage intermediate its ends and the other of which is connected to the second passage intermediate its ends, a valve in each passage normally opening the same, each valve being constructed and arranged to close one end of its associated passage to the inlet port and open the other end thereof to greater flow to the outlet port when moved in one direction and to close the other end of its associated passage to the outlet port and open said one end thereof to greater flow from the inlet port when moved in the opposite direction, means for hydraulically balancing only that valve which closes its associated passage to said inlet port, said means comprising valve guide means slidable in said first and second passages and associated with each of said valves, said valve guide means having one end subjected to the pressure existing in said first and second passages, and means for producing movement of the valves in opposite directions.

3. A fluid control device comprising inlet and outlet ports, a first passage connecting the inlet port to the outlet port, a second passage connecting the inlet port to the outlet port, two working ports, one of which is connected to the first passage intermediate its ends and the other of which is connected to the second passage intermediate its ends, a valve in each passage, said valve having a normally open position in which communication is established between the inlet and outlet ports, said valve being constructed and arranged to close one end of its associated passage to cut off communication between the working port of that passage and the inlet port when moved in one direction from said open position and to close the other end of its associated passage to cut off communication between the working port of that passage and the outlet port when moved in the opposite direction, means for hydraulically balancing only that valve which cuts off communication between its associated working port and the inlet port, said means comprising valve guide means slidable in said first and second passages and associated with each of said valves, said valve guide means having one end subjected to the pressure existing in said first and second passages, and means for producing movement of the valves in opposite directions.

4. A fluid control device comprising inlet and outlet ports, a first passage connecting the inlet port to the outlet port, a second passage connecting the inlet port to the outlet port, two working ports, one of which is connected to the first passage intermediate its ends and the other of which is connected to the second passage intermediate its ends, valve means in each passage comprising two valve seats, one located between the inlet port and the working port and the other located between the working port and the outlet port, two valve members, one for each seat arranged for movement in opposite directions from a neutral position in which communication is established between the working ports of the respective passages and the inlet and outlet ports, means creating a hydraulic balance on the valve member associated with the seat located between the working and inlet ports, said means comprising a valve guide element having a seat thereon for supporting said last mentioned valve member, the diameter of the end of the guide element, the seat on said guide element and the two valve seats in each passage being equal, means producing hydraulic reaction on the valve member associated with the seat located between the working and outlet ports, said reaction being established only when said last named valve member is moved from a neutral position toward its associated seat, and means for moving the valve members simultaneously in each passage in opposite directions.

5. A fluid control device comprising inlet and outlet ports, a first passage connecting the inlet port to the outlet port, a second passage connecting the inlet port to the outlet port, two working ports, one of which is connected to the first passage intermediate its ends and the other of which is connected to the second passage intermediate its ends, valve means in each passage comprising a first valve seat in the passage between the inlet and working ports and a second valve seat in the passage between the working port and the outlet port, two poppet valve members, one for each seat arranged for movement in opposite directions from a neutral position in which communication is established between the working ports of the respective passages and the inlet and outlet ports, means associated with each valve means for establishing the member associated with the seat located between the working and inlet ports in hydraulic balance, said means comprising a valve guide element having a seat thereon for supporting said last mentioned member, the diameter of the end of the guide element, the seat on said guide element and the two valve seats in each passage being equal, said member associated with the seat located between the working and outlet ports being at times subjected to hydraulic reaction which is always proportional to the effective seating area of said last named member, and means for moving the valve members simultaneously in each passage in opposite directions.

6. A fluid control device comprising inlet and outlet ports, a first passage connecting the inlet and outlet ports, a second passage connecting the inlet and outlet ports, two working ports, one of which is connected to the first passage intermediate its ends and the other of which is connected to the second passage intermediate its ends, valve means in each passage including two valve seats one of which is located between the inlet and working ports and the other of which is located between the working and outlet ports, two valve members, one for each seat, said two valve members having a neutral position wherein both the valve members are unseated, said members being movable in either direction from said neutral position for controlling flow between the working port and the inlet and outlet ports respectively, means providing a hydraulic balance for the valve member associated with the valve seat located between the inlet and working ports, said means comprising a cylindrical valve guide having a seat for supporting said last mentioned valve member, the diameter of said valve guide, the seat on said guide and the two valve seats in each passage being equal, the other of said two valve members being subjected at times to hydraulic reaction which is a measure of the pressure acting in the working port, and means for moving said members of each valve means in opposite directions from said neutral position.

7. A fluid control device comprising inlet and outlet ports, a first passage connecting the inlet and outlet ports, a second passage connecting the inlet and outlet ports, two working ports, one of which is connected to the first passage intermediate its ends and the other of which is connected to the second passage intermediate its ends, valve means in each passage for controlling communication between the ports and including two poppet valve members having a neutral position wherein communication is established between the ports, one of said valve members is located so as to control communication between the inlet and working ports and the other is located so as to control communication between the outlet and working ports, means providing a hydraulic balance for the valve member which controls communication between the inlet and working ports, said means including a valve guide element having a seat thereon for supporting said last mentioned valve member, said other valve member being subjected to hydraulic reaction when in a position to cut off flow between the working and outlet ports, and means for moving the valve members of one valve means in one direction from neutral and the valve members of the other valve means in the opposite direction.

8. A fluid control device comprising a body having inlet and outlet ports, a first passage in the body connecting the inlet and outlet ports, a second passage in the body connecting the inlet and outlet ports, two working ports, a first of which is connected to the first passage intermediate its ends and a second of which is connected to the second passage intermediate its ends, valve means in each of said passages for controlling communication between said ports, said valve means having an open position in which communication is established between all of its associated ports, said valve means comprising a first valve member reciprocably journaled in said body, a first valve seat interposed between said inlet port and one of said working ports, and on which said first valve member is seatable, a second valve member, a valve seat interposed between said outlet port and said one of the working ports and on which said second valve member is seatable, the effective areas of the valve seats of the respective valve means being unequal, means for hydraulically balancing only said first valve member, said means comprising valve guide means slidable in said first and second passages and associated with each of said valves, said valve guide means having one end subjected to the pressure existing in said first and second passages, and means for normally holding said first and second valve members in said open position.

9. A fluid control device comprising a body having inlet and outlet ports, a first passage in the body connecting the inlet port with the outlet port, a second passage in the body connecting the inlet port with the outlet port, two working ports, one of which is connected to the first passage intermediate its ends, and the other of which is connected to the second passage intermediate its ends, a valve in each passage normally opening the same, each of said valves comprising a first valve member reciprocably arranged in said body, a first valve seat interposed between said inlet port and one of said working ports and on which said first valve member is seatable, a second valve member, a valve seat interposed between said outlet port and said one of the working ports and on which said second valve member is seatable, the effective areas of the valve seats of the respective valve means being unequal, means for hydraulically balancing only said first valve member, said means comprising valve guide means slidable in said first and second passages and associated with each of said valves, said valve guide means having one end subjected to the pressure existing in said first and second passages, and means for producing movement of the valves in opposite directions.

10. A fluid control device comprising a body having inlet and outlet ports, a first passage in the body connecting the inlet and outlet ports, a second passage in the body connecting the inlet and outlet ports, two working ports, a first of which is connected to the first passage intermediate its ends and a second of which is connected to the second passage intermediate its ends, valve means in each of said passages for controlling communication between said ports, said valve means comprising a valve guide element provided with a seat thereon, a passage communicating said seat with one of the working ports, a valve seat interposed between the inlet port and said one working port, a valve seat interposed between said one working port and said outlet port, two valve members movable with respect to each other, one of said valve members being supported on the seat of said valve guide element and normally unseated from but seatable on the seat interposed between the inlet port and said one working port, said valve guide element and said last mentioned valve member always being in a state of hydraulic balance whether the valve member is on or off said last mentioned seat, the other of said valve members being normally unseated from but seatable on the valve seat interposed between said one working port and said outlet port, and means for positioning said valve members when off their respective seats.

11. A fluid control device comprising a body having inlet and outlet ports, a first passage in the body connecting the inlet port with the outlet port, a second passage in the body connecting the inlet port with the outlet port, two working ports, one of which is connected to the first passage intermediate its ends, and the other of which is connected to the second passage intermediate its ends, valve means in each of said passages for controlling communication between said ports, said valve means comprising a valve guide element provided with a seat thereon, a passage communicating said seat with one of said working ports, a valve seat interposed between the inlet port and said one working port, a valve seat interposed between the aforementioned one working port and said outlet port, two valve members movable with respect to each other, one of said valve members being supported on the seat of said valve guide element and normally unseated from but seatable on the seat interposed between the inlet port and said one working port, said valve guide element and said last mentioned valve member always being in a state of hydraulic balance whether the valve member is on or off said last mentioned seat, the other of said valve members being normally unseated from but seatable on the valve seat interposed between said one working port and said outlet port, and means for normally holding said valve members unseated from their respective seats and comprising a rocker arm which engages each of said other valve members, said rocker arm being rotatable to seat said other valve member in one of said passages while allowing said one valve member to seat in the other of said passages.

References Cited in the file of this patent

UNITED STATES PATENTS

| | | | |
|---|---|---|---|
| 1,582,468 | Heald | Apr. 27, | 1926 |
| 1,644,093 | Shonnard | Oct. 4, | 1927 |
| 2,240,163 | Pick | Apr. 29, | 1941 |
| 2,263,470 | Perkins et al. | Nov. 18, | 1941 |
| 2,354,960 | Morehouse | Aug. 1, | 1944 |
| 2,393,805 | Parker | Jan. 29, | 1946 |
| 2,554,843 | Staude | May 29, | 1951 |
| 2,556,746 | Ashton et al. | June 12, | 1951 |
| 2,568,052 | Catranis | Sept. 18, | 1951 |
| 2,685,342 | Lauck | Aug. 3, | 1954 |

FOREIGN PATENTS

| | | |
|---|---|---|
| 445,559 | Great Britain | of 1936 |